United States Patent [19]
Jones, Jr.

[11] 3,798,969
[45] Mar. 26, 1974

[54] TANK LIQUID LEVEL DETERMINING APPARATUS
[75] Inventor: John P. Jones, Jr., Scarsdale, N.Y.
[73] Assignee: Mobil Oil Corporation, New York, N.Y.
[22] Filed: May 22, 1972
[21] Appl. No.: 255,610

[52] U.S. Cl. ............................ 73/309, 73/322.5
[51] Int. Cl. ............................ G01f 23/12
[58] Field of Search ............ 73/309, 311–313, 73/319, 322.5, 310, 314–318, 320–322; 340/244 A, 244 B

[56] References Cited
UNITED STATES PATENTS
2,460,503  2/1949  Howe.................................. 73/313

Primary Examiner—Donald O. Woodiel
Attorney, Agent, or Firm—Andrew L. Gaboriault; Carl D. Farnsworth

[57] ABSTRACT

A liquid level responsive device is described for use in tanker vessels to read out ullage directly on a gauge comprising in combination a strain gauge connected to an elongated buoyancy measuring means extending substantially vertically from substantially the bottom of the tank to substantially the top of the tank and sized in at least the upper extremity thereof so that the buoyant force of a liquid on the upper enlarged portion of the buoyancy means per linear incremental change in level of liquid in the tank becomes maximized as the level of liquid fills the tank.

6 Claims, 3 Drawing Figures

TANK LIQUID LEVEL DETERMINING APPARATUS

BACKGROUND OF THE INVENTION

The measuring of liquid level in a storage tank has been accomplished by various means and techniques in the prior art. One method involves the use of a glass sight gauge. In another method, electrical strain sensitive elements for measuring the apparent weight of a float submerged in a liquid and thereby determine the specific gravity of the liquid (U.S. Pat. No. 2,460,503) has been proposed. A still further method relies upon a plurality of interconnected and vertically spaced float means (U.S. Pat. No. 2,474,154) which indicate the level of the liquid or a solenoid device (U.S. Pat. No. 2,069,959) connected to a float has been relied upon. In addition, tapes and rods have been used in tanks permitting this type of measuring. However, none of these known devices has proven sufficiently reliable to provide remote readout with repetitive accuracy particularly in the upper part of the cargo tanks of tanker vessels where extreme accuracy is required. The present invention is concerned with solving this problem.

SUMMARY OF THE INVENTION

This invention is concerned with a method and apparatus for determining the level of liquid in relatively large tanks such as encountered in cargo tanks of tanker vessels. In one aspect the present invention is concerned with the improved means and apparatus for measuring the displacement characteristics of a fluid for minimizing ullage during filling of a tank relying upon an electrical sensing element in combination with a buoyant displacing element or float sized in such a manner that fluids of different density may be gauged with the same required degree of accuracy. In the arrangement of means of this invention the sensing element produces a signal in response to the buoyant effect of the fluid on the float and the sensed signal is transmitted and displayed at the tank site or electrically transmitted to a remote station for readout and recording by instruments provided for this purpose.

In yet another aspect the invention is concerned with providing an improved buoyancy or floatation means in combination with means for indicating the displacement or level of different fluids during filling and discharge within very narrow limits amounting to not more than flow about 0.25 inches up to about 1.0 inch in a hazardous area. The float force is measured by a strain gauge mechanically linked thereto in either compression or tension loads therewith and generates a microvolt electrical signal indicative of the incremental level of the fluid in the tank. In a more particular aspect the present invention comprises an elongated floatation means suspended in a liquid holding tank and restricted to provide limited vertical movement for measuring the buoyancy characteristics of a fluid and thus the level thereof in the tank when properly calibrated.

The buoyancy means or float of this invention is an elongated cylindrical configuration of larger diameter in the upper part than the lower part extending substantially the vertical height of the liquid holding tank and sized in at least the upper end thereof so that incremental buoyancy changes resulting from incremental changes in the level of liquid within the tank becomes substantially maximized for a relatively short distance in a region known as the tank topping off region and before the level of liquid fills the tank. Thus it is contemplated providing a long cylindrical closed pipe and providing the upper end of the pipe with an enlarged section of pipe of a size which will provide a relatively large linear incremental buoyancy displacement compared to the smaller pipe extending downwardly therefrom. Filling the buoyancy means with a buoyant material such as foamed plastics or other synthetic material suitable for the purpose permits the use of relatively thin walled metal tubing and/or pipes in fabricating the buoyancy means of this invention. A flotation member particularly suitable for the purpose of this invention is more specifically described in a specific example hereinafter.

The use of strain gauges or electrical sensing devices to convert a mechanical force to an electrical signal is not a new area of technology. It is also known that such a generated strain gauge signal can be amplified and transmitted to a remote location for readout or recording by instruments. The present invention contemplates such a practice and is of particular importance when used on large tanker vessels comprising a plurality of separate liquid holding tanks of large capacity to assist with maintaining desired vessel trim in the water and in controlling the flow rates of cargo with respect to the various tanks during loading or discharge. It is important that the cargo is loaded or discharged evenly to avoid overstressing the hull which could cause the vessel to rupture.

BRIEF DESCRIPTION OF THE DRAWINGS

Referring now to FIG. 1 by way of example, there is shown one arrangement for mounting an elongated float member fabricated of pipe sections of different cross sectional area and arranged to extend substantially vertically downwardly to substantially the bottom of a large cargo tank such as used to transport crude oil and refined product thereof in large tanker vessels. The upper end of the pipe float member is connected through an opening in the upper surface of the tank or ship's deck as the case may be to a semi-rigid vertically moveable seal means and suitable linkage to a strain gauge such as a ring transducer load cell. The strain gauge and linkage support the float and responds to the force applied through buoyancy from the float means to produce a signal calibrated to provide a readout on a display gauge indicative of the level of fluid in the tank. The float means comprising, for example, a pipe of enlarged cross section provided in the upper portion thereof from which hangs a smaller cylindrical pipe section extending downwardly to substantially the bottom of the tank.

The liquid level float means of this invention is a dual sized floatation means comprising a small size elongated cylindrical float part extending from substantially the bottom of the tank to an upper level thereof known as the topping off portion of the tank. The topping off portion of the tank includes approximately the upper 6 feet of the tank below the tank roof or deck, for example, of a tanker vessel. The small size elongated cylindrical float portion is fabricated in a specific example from 6 inch diameter pipe and its buoyancy effect is coupled to provide a sensitivity of approximately 1 microvolt output signal per increment of liquid level change of about 0.01 foot. A second or enlarged cylindrical float part or portion fabricated in this specific example from 24 inch diameter pipe is attached to and extends from the upper end of the smaller pipe section to substantially the top of the tank and this is confined substantially in the topping off region of the tank. An output signal generated in response to the larger 24 inch diameter float part is converted electronically to provide an abrupt calibration change by a factor representing the ratio between the displacements of the large and small float parts. The large float part thus will rely upon a sensitivity signal amounting to approximately a 16 microvolt output signal per increment of liquid level change equivalent to about 0.01 foot. Thus by maintaining a ratio of approximately 16 in the cross-sectional area of the float parts, any error accumulated due to an improperly identified liquid density which is plugged into an adjustable recording instrument will be automatically compensated for within acceptable limits by the larger float part because of the ratio factor of the incremental displacements of the float parts. In addition liquid fill densities outside the range of from about 0.65 to 1.025 will seldom be encountered assuming that no materials lighter than gasoline or heavier than sea water will be shipped in tanker vessels.

Figure 1:
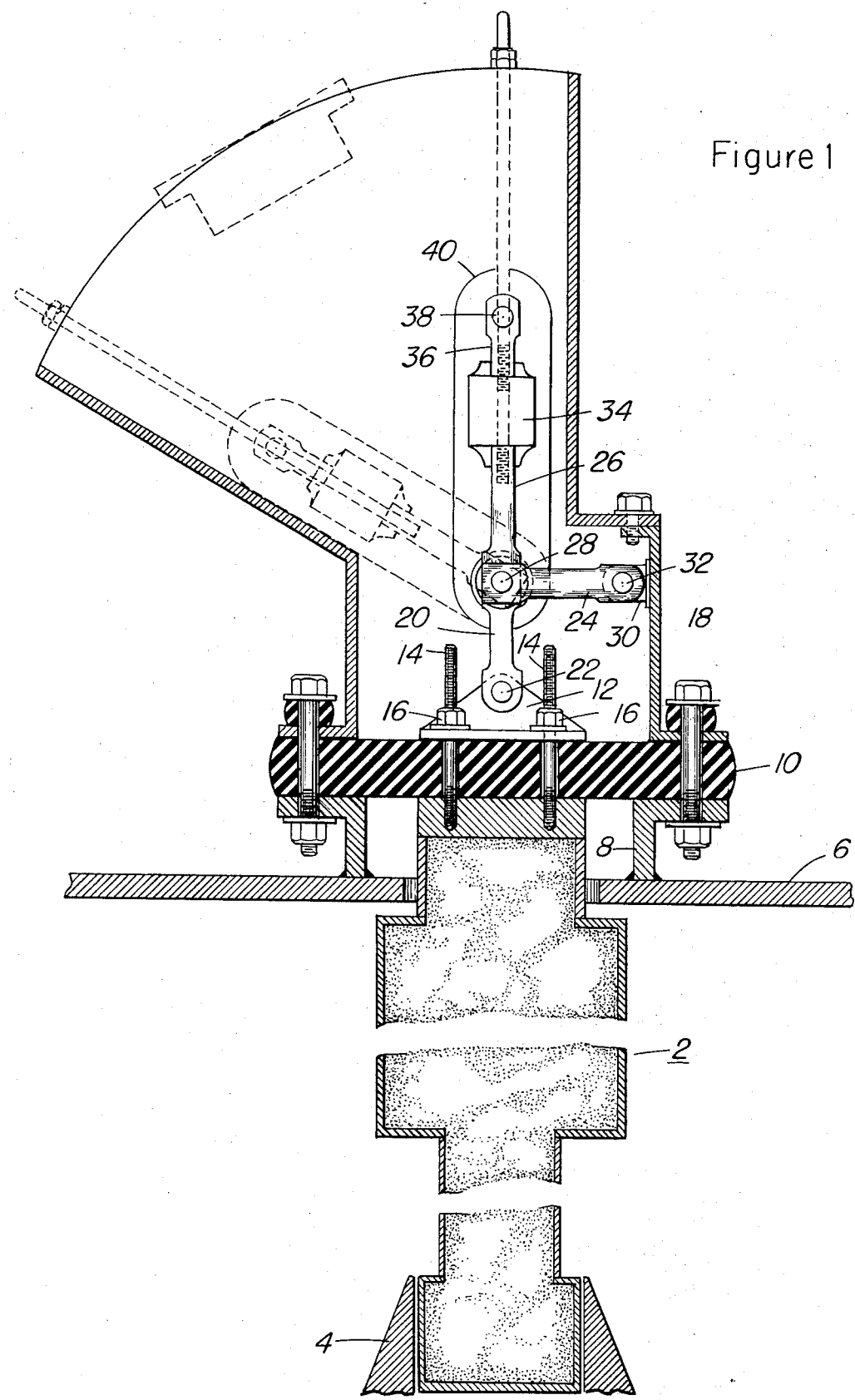
FIG. 1 is a side elevational view of one arrangement of apparatus of this invention diagrammatically representing an elongated float member semi-rigidly restricted to limited vertical movement through a flexible seal member fastened to the upper surface of a liquid holding tank as well as the float member and connected mechanically to a force applied measuring element such as an electrical transducer or a strain gauge load cell housed above the flexible seal member.

In the arrangement of FIG. 1, the elongated pipe float 2 is positioned substantially vertically within a liquid storage or ships cargo tank. The float in a specific example is about 6 inches short of 82 feet, 6 inches, the ullage depth of the liquid holding tank, and is fabricated of different diameter pipe sections as above identified in a specific embodiment which are filled with a solid material of light weight such as foamed plastic or other buoyancy including material compatable for the purpose to maintain float buoyancy in the event a leak should develop through the walls of the pipe fabricated float. The float assembly of FIG. 1 is formed of 6 inch diameter pipe except at the top portion down to 10'-0" ullage which is formed of 24 inch diameter pipe. Of course, depending on the depth of the liquid holding tank and the range of specific gravity of liquids to be carried other pipe sizes may be employed to meet the required buoyancy limits and to provide the degree of accuracy required. The greater the size of the large pipe in relation to the small pipe the less the error due to incorrect specific gravity correction setting since an error of e.g. 1 foot on the 6 inch pipe would be reduced (by the ratio of the cross section areas) to less than 1 inch when the level reaches the 24 inch pipe. Thus the ship's loading officers are able to rely upon the ullage reading being sufficiently accurate near the top to permit filling the tanks to a close ullage (within 6" – 12" of the top) but not overfilling which could rupture the tank and spill the liquid fill. Since it is possible today to load tankers at rates as high as 140,000 gallons per minute and since the specific gravity and temperature of the cargo may not be exactly known before and during filling, the foregoing described feature of substantially self correction of an unrecognized error due to improperly identified specific gravity and temperature (which could amount to as much as several feet or more) is a key feature of the float assembly of this invention which will enable the loading of a vessel to be carried out efficiently and safely.

In view of the length of the vertical float assembly which may be up to about 80 feet and contemplated by this invention, suitable means to provide restricted horizontal movement may be provided such as slip fit bracing rings, for example, at spaced intervals throughout the floats vertical height to minimize bending or whipping of the pipe induced by motion of the fluid in the tank or due to motion imposed by, for example, a ship underway.

In a specific embodiment the 24-inch diameter pipe portion of the float of FIG. 1 is approximately 6 feet long so as to enlarge the forces imposed upon the float due to incremental changes in liquid level as the tank nears its fill capacity and thus reduce any accumulated error in liquid level imposed by way of the smaller pipe, due to an incorrect specific gravity setting. This relationship is important because an error in indicated level represents an error in buoyancy force, which force represents a substantial distance (error) by way of the small pipe but only a small distance (error) by way of the large pipe. As an example, if the change in buoyancy force due to an imcremental change in liquid level is 1 pound per inch by way of the small pipe and 16 pounds per inch by way of the large pipe, then an error of 8 inches as the level nears the top of the small pipe represents an error of 8 pounds but when the level reaches the large pipe an error of 8 pounds represents only ½ inch. Therefore the 8 inch error is reduced to ½ inch (i.e. by the ratio factor between the cross sectional displacement areas of the two pipes).

It will be observed that the bottom of the float assembly is maintained about 6 inches above the floor of the tank to allow for contraction and expansion of a ship's hull in a seaway and is confined within a restricted area against horizontal movement by a plurality of upwardly extending triangular flanges or baffles 4. The bottom end of the float may not be enlarged as shown. The upper enlarged portion of the pipe float assembly is spaced a relatively small distance below the tanks upper surface and maybe not more than about 1 inch. Thus vertical movement of the pipe float is relatively severely restricted and generally will not exceed about five-thousandths of an inch which is a typical range of movement of the strain gauge to which it is attached. The support member at the very top portion of the float may be formed of solid rod or of smaller diameter pipe such as 8 inch pipe and extend upwardly through an opening in the top surface of the tank as shown. The top surface of the pipe float is provided with a plurality of upwardly extending mounting bolts used as described hereinafter. The top side of the deck or tank is fitted in this specific arrangement with a circular pipe flange 8 about the opening and is provided with a horizontal lip upon which rests a semi-rigid vertically flexible member 10 covering the opening and used for sealing the tank from the adjacent outside atmosphere. The flexible member may be a high nitrile rubber of low durometer or any other flexible material suitable for this service. In the figure, a 3-inch thick piece of high nitrile rubber material is relied upon for covering the opening and sealing the interior thereof from exterior atmosphere. The pipe float assembly is connected to a bracket 12 on the opposite or top side of the thick rubber seal by the plurality of mounting bolts 14 extending from the top of the float through the rubber and holes in the bracket. The bolts are provided with nuts 16 for compressing the rubber to form a seal between bracket 12 and the top of pipe float 2. A matching housing 18 provided with a right angle flange on the bottom thereof is positioned on the top surface of the rubber seal and bolted through the seal 16 to the flange of member 18 as shown. The housing 18 is formed of 16 inch diameter pipe in a lower portion thereof and is relied upon to support and retain or house the measuring device comprising the load cell with interconnecting linkage. In the arrangement of FIG. 1, a first connecting link 20, flexibly connects to bracket 12 by a pin 22. Link 20 is flexibly connected at its other end to links 24 and 26 by pin 28. Link 24 is attached by bracket 30 and pin 32 to housing 18 as shown with link 26 fastened by a screw connection to load cell or strain gauge 34. Link 36 is fastened by a screw connection to the upper end of strain gauge 34 and to a support yoke 40 through pin 38. The relationship of these parts is more clearly shown by FIG. 2 which is a front elevational view of the side elevational view of FIG. 1.

Figure 2:
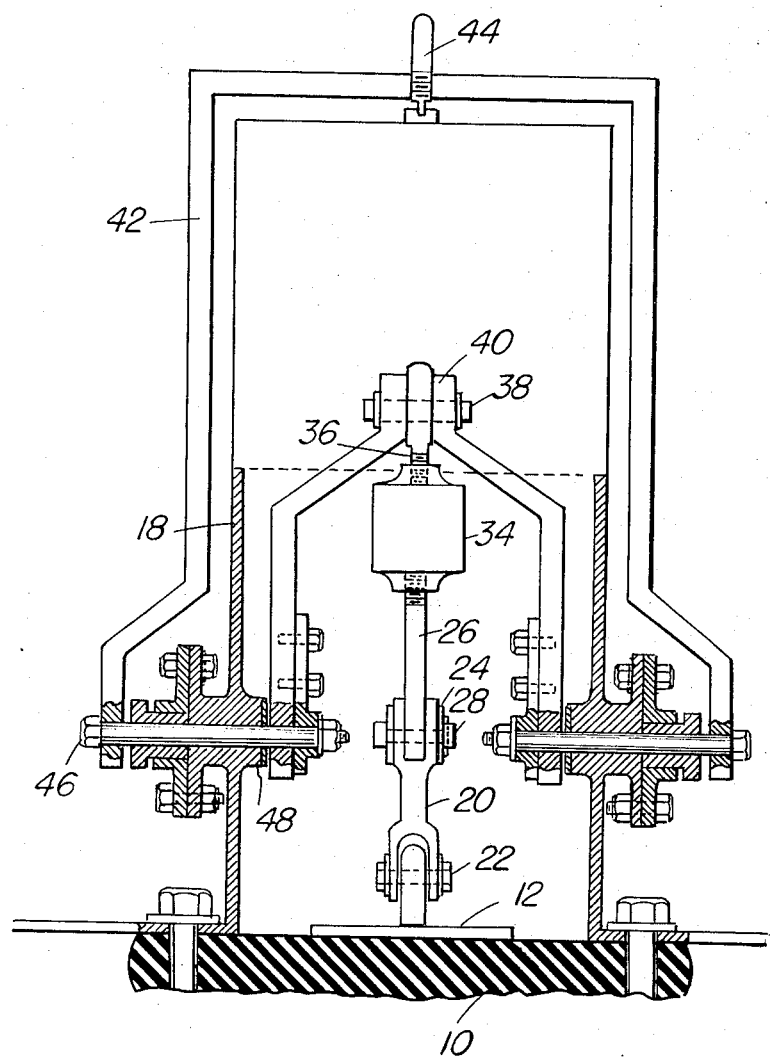
FIG. 2 is a front elevational view of the upper portion of FIG. 1 showing the relationship of interconnecting linkage relied upon to semi-rigidly connect an applied force measuring element to the float and the arangement relied upon to alter the force imposed upon the applied force measuring element for different fluids confined in the tank.

From the discussion above presented of FIG. 1 it is evident that the weight of the pipe float assembly is supported by the yoke member 4 more clearly shown and described with respect to FIG. 2 with the 3-inch rubber seal providing semi-rigid resistance in vertical movement of the float while substantially restricting horizontal movement thereof. Thus in this arrangement the strain gauge is maintained under tension by link 36 and yoke 40 resisting the downward pull of the float through links 20 and 26. Link 24 is provided to locate the pull on the strain gauge along a particular axis no matter in which position from the vertical the strain gauge is positioned to alter the loads imposed thereon. Thus by changing the position of the strain gauge from the vertical the loads imposed therein will be changed and such a change in imposed load due to buoyancy after zeroing out the pipe weight can be correlated with the buoyancy effect of different fluids such as between sea water, crude oil and refined liquid products of the crude oil so that the same tank level gauge may be used for fluids of different specific gravity. It is also to be noted that the signal generated by the strain gauge and converted through suitable electrical circuitry such as a wheatstone bridge to condition the signal may be used with recording instruments placed for local and remote readout.

By referring to FIG. 2 it is possible to achieve a more clear understanding of the operation of the assemblage of FIG. 1 particularly with respect to the linkage relied upon for changing the position of the straing gauge and thus the force applied thereto. Thus a lever 42 provided with an adjusting handle and stop 44 is maintained movingly relevant to housing 18 but rigidly connected to yoke 40 through a splined coupling shaft 46 which passes through a support bearing 48 affixed to housing 18. The bearing, shaft and yoke assembly with interconnecting linkage above described must be carefully fabricated of suitable materials since this assemblage must support a considerable portion of the weight of the pipe float assembly which in one specific embodiment has been calculated to amount to about 3,000 pounds.

The tank liquid level gauge above described and designed for use in large tanker vessel cargo tanks is desirably fabricated of corrosion resistant or coated materials and constructed to withstand considerable abuse over long periods of use. The assemblage herein described is particularly advantageous in these respects since there are no moving parts, guide wires, tapes or electric equipment positioned inside the tank. No valves are used in the system or parts depending for operation upon compressed air. The foregoing items have frequently contributed to malfunction of tank gauging systems.

Figure 3:
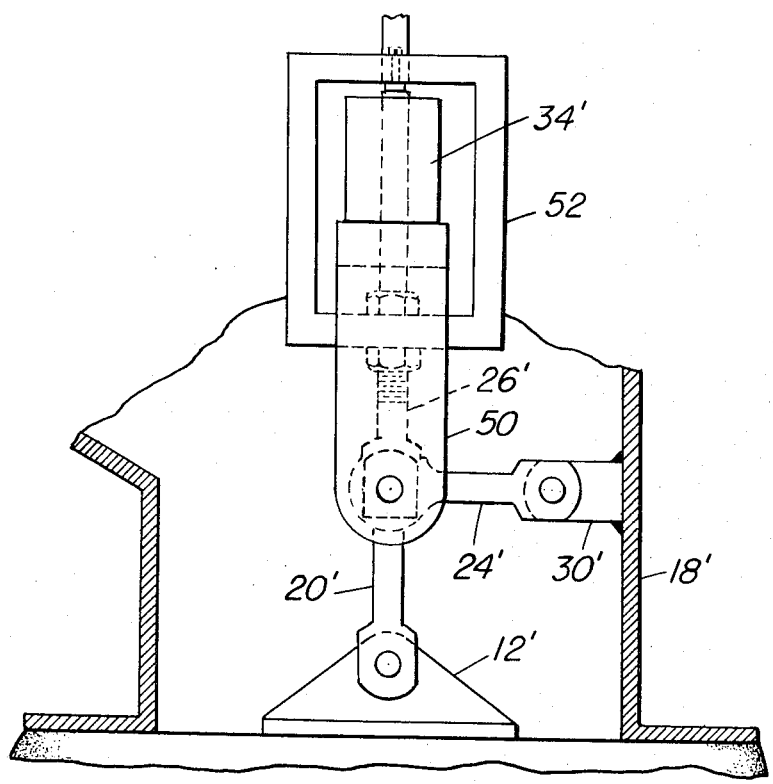
FIG. 3 is a side elevational view of an alternative arrangement of apparatus for imposing compression loads upon a strain gauge by the float means of this invention.

FIG. 3 departs from that shown in FIGS. 1 and 2 in providing a relationship of parts which will transpose the loads imposed by the pipe float probe upon the strain gauge to loads of compression rather than loads of tension as provided by the apparatus of FIG. 1. In this figure, two 90 degree apart support members or yokes, one comprising a ring member 52 and U-shaped means 50, are provided in opposing reaction coordination with one another so that one support member comprising the ring 52 is connected to link 26' corresponding to link 26 of FIG. 1. Link 26' is coupled to links 24' and 20' similarly to 24 and 20 of FIG. 1. The U-shaped yoke means 50 passes through ring 52 and is in compression load arrangement therewith through strain gauge 34'. Yoke means 50 is supported by wall 18' and may be attached to an adjusting handle similarly to yoke 40 of FIG. 1. Thus the upper portion of ring 52 is separated from the upper surface of the yoke 50 by strain gauge 34' and connected by linkage 26' and 20' to brakcet 12' bolted to the upper end of the float assembly as described with respect to FIG. 1. Of course the apparatus of FIGS. 1 and 3 may be modified to eliminate the linkage for altering the position of the strain gauge as shown, that is, the strain gauge could be restricted to remain in the vertical position, in which case the specific gravity correction can be fed into the instrumentation electronically by interposing suitable resistors and circuitry. As before, the output signal from the strain gauge, at the level when the fluid reaches the bottom end of the large pipe, in accordance with the specific gravity setting, is recorded electronically by a factor equal to the ratio of the cross sectional areas of the large and small pipes, thus retaining the inherent feature of self correcting by reducing the error due to incorrect S.G. input by a factor equal to said ratio. As a further example let us assume that a liquid cargo is to be loaded and the specific gravity figure furnished to the vessel prior to loading is incorrect by 1 percent (a common occurrence). The cargo officer will direct the rate of loading of the cargo into the various tanks and the order in which the tanks are loaded, in accordance with a carefully prepared plan to insure that the imposed loading forces are properly distributed so that predetermined limitations of loading stresses in the hull are not exceeded. In any particular tank, having an empty ullage of say 82' – 6" and a full ullage of 3' – 10", at which the tank capacity is about 6,700,000 gallons, the bottom of the large pipe float section is about the 10'-0" ullage level. When the actual level of cargo reaches the vicinity of the bottom of the large pipe float section, the ullage readout due to a 1 percent error will be incorrect by approximately 8 inches (slight difference according to whether the S.G. error is on the high or low side). An error of 8 inches is unacceptable as there would be a risk of rupturing the tank. However upon reaching the 10'-0" ullage level the error is reduced by a factor of approximately 16 (the ratio of the incremental displacement factor of 24 inches and 6 inches), thus the 8 inch error is now reduced to ½ inch, which is an acceptable error and the tank can be safely "topped up," or filled, to the planned 4'-6" ullage level.

Having thus generally described my invention and described a specific embodiment thereof, it is to be understood that no undue restrictions are to be imposed by reason thereof except as defined by the following claims.

I claim:

1. A device for determining the level of liquid in a tank comprising:
   a. a strain gauge attached to a liquid holding tank upper closure member for converting a buoyant force to an electrical signal;
   b. a downwardly extending float means of dual cylindrical dimensions suspended from said strain gauge and extending to substantially the bottom of said tank;
   c. said float means comprising an upper cylindrical buoyant chamber of substantially larger diameter than a lower smaller diameter cylindrical buoyant member of said float means therebelow and;
   d. said buoyant chambers cylindrically sized with respect to one another to compensate within predetermined limits for errors identified with density of liquid being carried by the tank to avoid over-filling of the tank with a liquid.

2. The device of claim 1 in which the strain gauge-float arrangement means is sized to provide a sensitivity of about one microvolt per liquid level change of 0.01 foot on the smaller diameter float section.

3. The device of claim 1 in which the strain gauge-float arrangement means is sized to provide a sensitivity of about 16 microvolts per liquid level change of 0.01 foot on the larger diameter float section.

4. A liquid level recording device used with a liquid holding tank provided with an upper closure member comprising in combination:
   a. a vertically positioned float assembly means suspended from a strain gauge rigidly attached to the tank upper closure member;
   b. said strain gauge developing an electronic signal in response to a liquid imposed vertical change in position of said float assembly means;
   c. said float assembly means comprising an upper enlarged cylindrical float member rigidly attached to a smaller diameter cylindrical float member forming a lower portion of said float assembly means and extending to substantially the bottom of said tank;
   d. said smaller diameter cylindrical float member sized to provide a preselected signal sensitivity per preselected increment of liquid level change thereon;
   e. said upper enlarged cylindrical float member sized to respond to changes in liquid level thereon and provide a change represented by an electronic signal generated by said strain gauge of a factor representing the ratio in the incremental displacements between the larger and smaller diameter float members; and
   g. the ratio factor between the float members being sufficiently large to automatically compensate within prescribed limits for an incorrect liquid density correction used with said liquid level recording device.

5. A liquid level recording device for large tanks comprising in combination:
   a. a rigid float assembly means suspended substantially vertically from a signal generating device attached to the tank upper closure member;
   b. said float assembly means comprising an upper enlarged buoyant members attached to a smaller diameter pipe float member extending continuously downwardly therefrom to substantially the bottom of the tank; and
   c. the ratio in the incremental liquid displacements between the upper enlarged buoyant member and the smaller diameter pipe float member being sufficiently large to respond to liquid level changes amounting to a small fraction of a foot in at least the upper portion of the tank.

6. A liquid level measuring and recording device for large tanker vessels comprising in combination:
   a. a vertically extending rigid float member of abruptly large diameter in the top portion thereof and of a smaller diameter in the lower extending portion thereof;
   b. said elongated float member extending the substantial vertical distance of a liquid holding tank in a tanker vessel;
   c. said float member suspended from a signal generating means attached to an upper closure member of said tank;
   d. said signal means providing an abrupt calibration change in response to a factor representing the ratio in displacements between the large and smaller diameter buoyant members of said float member when a liquid fill encounters the large diameter portion of the float member;
   e. said ratio being sufficiently large to compensate for unknown differences when presetting instrument responding to said signal generating means for liquids of different density and;
   f. the upper surface of the enlarged buoyant member of said float member being adjacent but spaced vertically apart from said tank upper closure member.

* * * * *